United States Patent
Bergman et al.

(10) Patent No.: US 9,920,633 B2
(45) Date of Patent: Mar. 20, 2018

(54) COMPOUND FILLET FOR A GAS TURBINE AIRFOIL

(71) Applicant: United Technologies Corporation, Hartford, CT (US)

(72) Inventors: Russell J. Bergman, Windsor, CT (US); Jess J. Parkin, West Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 305 days.

(21) Appl. No.: 14/635,243

(22) Filed: Mar. 2, 2015

(65) Prior Publication Data

US 2016/0258296 A1 Sep. 8, 2016

(51) Int. Cl.
*F01D 5/14* (2006.01)
*F01D 9/04* (2006.01)

(52) U.S. Cl.
CPC ............ *F01D 5/147* (2013.01); *F01D 5/143* (2013.01); *F01D 9/041* (2013.01); *F05D 2220/32* (2013.01); *F05D 2230/50* (2013.01); *F05D 2240/12* (2013.01); *F05D 2240/121* (2013.01); *F05D 2240/122* (2013.01); *F05D 2240/30* (2013.01); *F05D 2240/303* (2013.01); *F05D 2240/304* (2013.01); *F05D 2240/80* (2013.01); *F05D 2250/71* (2013.01); *F05D 2260/941* (2013.01); *Y02T 50/673* (2013.01)

(58) Field of Classification Search
CPC ...... F01D 5/145; F01D 5/1432; F01D 5/3061; F01D 9/042; F01D 5/147; Y02T 50/672; Y02T 50/673

USPC .... 416/234, 233, 428, 180, 166, 182, 193 A
See application file for complete search history.

(56) References Cited

U.S. PATENT DOCUMENTS

| | | | |
|---|---|---|---|
| 6,851,924 B2 * | 2/2005 | Mazzola | F01D 5/145 415/115 |
| 7,217,094 B2 * | 5/2007 | Cunha | F01D 5/141 416/193 A |
| 7,371,046 B2 | 5/2008 | Lee et al. | |
| 8,206,095 B2 | 6/2012 | Parker et al. | |
| 2004/0062636 A1 | 4/2004 | Mazzola et al. | |
| 2005/0036890 A1 | 2/2005 | Tomberg et al. | |
| 2005/0106025 A1 | 5/2005 | Snook et al. | |
| 2006/0275112 A1 | 12/2006 | Lee et al. | |

FOREIGN PATENT DOCUMENTS

EP 1731712 12/2006
EP 218442 A1 * 11/2008 ............... F01D 5/14

OTHER PUBLICATIONS

Extended European Search Report for European Application No. 16158144.2 dated Aug. 4, 2016.

* cited by examiner

Primary Examiner — Woody Lee, Jr.
Assistant Examiner — Elton Wong
(74) Attorney, Agent, or Firm — Carlson, Gaskey & Olds, P.C.

(57) ABSTRACT

A component for a gas turbine engine includes an airfoil that has a first end. A first platform is located at the first end of the airfoil. A compound fillet includes a first fillet portion tangent to the first platform and an airfoil offset. A second fillet portion is tangent to a surface of the airfoil and the first fillet portion.

20 Claims, 3 Drawing Sheets

COMPOUND FILLET FOR A GAS TURBINE AIRFOIL

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

The compressor section and the turbine section each include multiple arrays of blades and vanes. During operation of the gas turbine engine, the arrays of blades and vanes are subject to load and thermal stresses. This is particularly true in the turbine section where the arrays of blades and vanes interact with the hot combustion gases leaving the combustor section. The load and thermal stresses can be the greatest at the intersection of an airfoil and a platform. Therefore, there is a need to reduce stresses in the vanes and blades at the intersection of the airfoil and the platform.

SUMMARY

In one exemplary embodiment, a component for a gas turbine engine includes an airfoil that has a first end. A first platform is located at the first end of the airfoil. A compound fillet includes a first fillet portion tangent to the first platform and an airfoil offset. A second fillet portion is tangent to a surface of the airfoil and the first fillet portion.

In a further embodiment of any of the above, the airfoil offset is a surface that extends generally parallel to the airfoil.

In a further embodiment of any of the above, the first fillet portion has a first radius and the second fillet portion has a second radius that is greater than the first radius.

In a further embodiment of any of the above, the first fillet portion includes a radius of approximately 0.125 inches. The second fillet portion includes a radius of approximately 0.700 inches. The airfoil offset is spaced from the airfoil approximately 0.022 inches.

In a further embodiment of any of the above, a single fillet is located at an intersection of the first end and the first platform and spaced from the compound fillet.

In a further embodiment of any of the above, a transition fillet is located at the intersection of the first end and the first platform axially between the compound fillet and the single fillet.

In a further embodiment of any of the above, the compound fillet extends from approximately 23% to 32% of the axial chord length from the leading edge of the airfoil on a pressure side of the airfoil around the leading edge of the airfoil and to approximately 15% to 25% of the axial chord length from the leading edge on a suction side of the airfoil.

In a further embodiment of any of the above, the compound fillet extends from approximately 28% of the axial chord length from the leading edge on the pressure side around the leading edge of the airfoil and to approximately 20% of the axial chord length from the leading edge on the suction side.

In a further embodiment of any of the above, the single fillet extend from approximately 48% of the axial chord length from the leading edge on the pressure side around the trailing edge of the airfoil to approximately 50% of the axial chord length from the leading edge on the suction side.

In a further embodiment of any of the above, the airfoil is a vane and includes a second platform located at a second end of the airfoil. A second compound fillet is located at an intersection of the second end and the second platform.

In a further embodiment of any of the above, the first fillet portion is tangent to a radially outer surface of the first platform.

In another exemplary embodiment, a gas turbine engine includes an airfoil located in one of a compressor section or a turbine section. A first platform is attached to the airfoil. A compound fillet including a first fillet portion tangent to the first platform and an airfoil offset. A second fillet portion is tangent to a surface of the airfoil and the first fillet portion.

In a further embodiment of any of the above, the airfoil offset is a surface that extends generally parallel to the airfoil.

In a further embodiment of any of the above, the first fillet portion has a first radius and the second fillet portion has a second radius that is greater than the first radius.

In a further embodiment of any of the above, a single fillet is located at an intersection of the airfoil and the first platform and spaced from the compound fillet.

In a further embodiment of any of the above, the airfoil is a vane and includes a second platform that is attached to the airfoil and a second compound fillet that is located at an intersection of the airfoil and the second platform.

In another exemplary embodiment, a method of forming an airfoil includes locating a platform relative to an airfoil. A first fillet portion is formed tangent to the platform and an airfoil offset. A second fillet portion is formed tangent to the first fillet portion and a surface of the airfoil.

In a further embodiment of any of the above, the airfoil offset is a surface that extends generally parallel to the airfoil.

In a further embodiment of any of the above, the first fillet portion has a first radius and the second fillet portion has a second radius that is greater than the first radius.

In a further embodiment of any of the above, a single fillet is located at an intersection of the airfoil and the first platform and spaced from the compound fillet.

The various features and advantages of this disclosure will become apparent to those skilled in the art from the following detailed description. The drawings that accompany the detailed description can be briefly described as follows.

DETAILED DESCRIPTION

Figure 1:
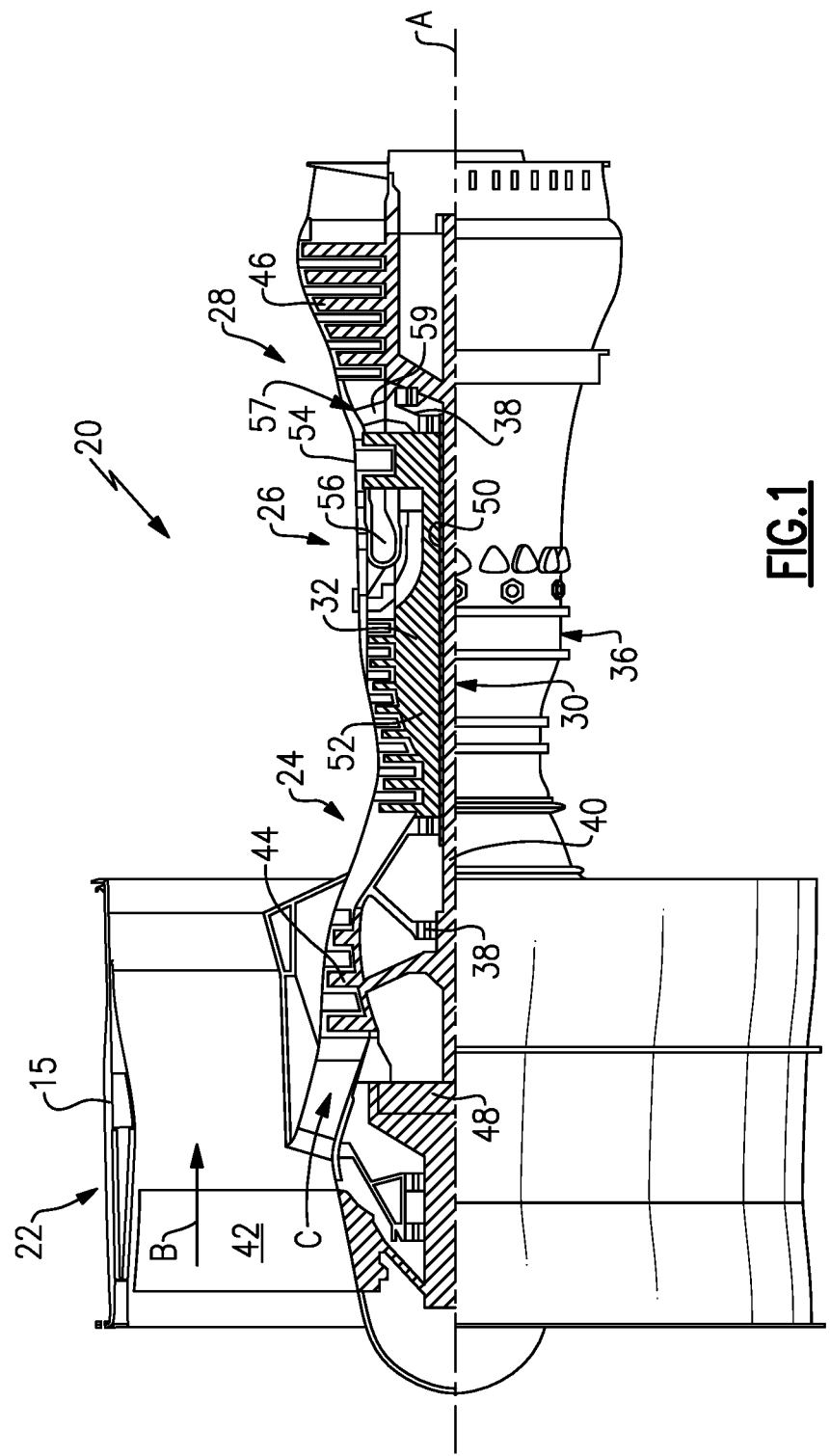
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 meters/second).

The example gas turbine engine includes fan 42 that comprises in one non-limiting embodiment less than about twenty-six (26) fan blades. In another non-limiting embodiment, fan section 22 includes less than about twenty (20) fan blades. Moreover, in one disclosed embodiment low pressure turbine 46 includes no more than about six (6) turbine rotors schematically indicated at 34. In another non-limiting example embodiment low pressure turbine 46 includes about three (3) turbine rotors. A ratio between number of fan blades 42 and the number of low pressure turbine rotors is between about 3.3 and about 8.6. The example low pressure turbine 46 provides the driving power to rotate fan section 22 and therefore the relationship between the number of turbine rotors 34 in low pressure turbine 46 and number of blades 42 in fan section 22 disclose an example gas turbine engine 20 with increased power transfer efficiency.

Figure 2:
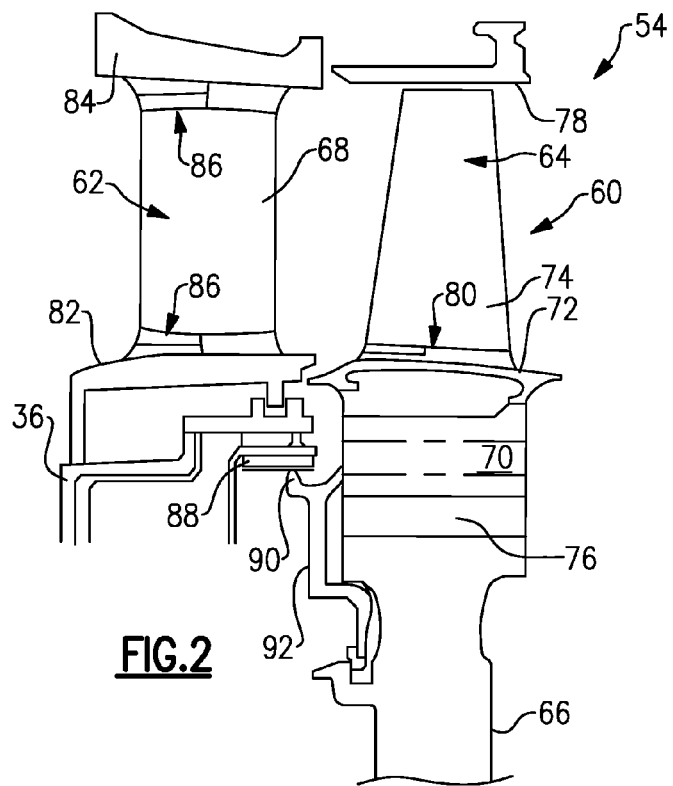
FIG. 2 is a sectional view of a turbine section of the gas turbine engine of FIG. 1.

FIG. 2 illustrates an enlarged schematic view of the high pressure turbine 54, however, other sections of the gas turbine engine 20 could benefit from this disclosure, such as the compressor section 24, the low pressure turbine 46, or any other airfoil located in the gas turbine engine 20. The high pressure turbine 54 generally includes a one-stage turbine section. However, this disclose also applies to a two-stage turbine section. A rotor assembly 60 is attached to and rotates with the outer shaft 50 (FIG. 1).

The rotor assembly 60 includes an array of rotor blades 64 circumferentially spaced around a disk 66. Each of the array of rotor blades 64 includes a respective root portion 70, a platform 72, and an airfoil 74. Each of the root portions 70 is received within a respective rim 76 of the disk 66. The airfoil 74 extends radially outward toward a blade outer air seal (BOAS) assembly 78 from the platform 72 to a free end.

The array of rotor blades 64 is disposed in a core airflow path. The core airflow path was pressurized in the compressor section 24 then heated in the combustor section 26. The platform 72 separates a hot gas core airflow path side inclusive of the array of rotor blades 64 and a non-gas core airflow path side inclusive of the root portion 70. A blade fillet region 80 is located between the airfoil 74 and the platform 72.

An array of vanes 62 is located upstream of the array of rotor blades 64. Each of the array of vanes 62 includes an airfoil 68 extending between a respective vane inner platform 82 and a vane outer platform 84 to direct the hot gas core airflow path past the array of vanes 62. The array of vanes 62 may be supported by the engine static structure 36. Vane fillet regions 86A, 86B are located between the airfoil 68 and the vane inner platform 82 and the vane outer platform 84, respectively.

An abradable annular seal 88, such as a honeycomb seal, prevents the hot gas airflow path from traveling radially inward. The abradable annular seal 88 is located adjacent a first knife edge seal 90 that extends from a first disk plate 92.

Figure 3:
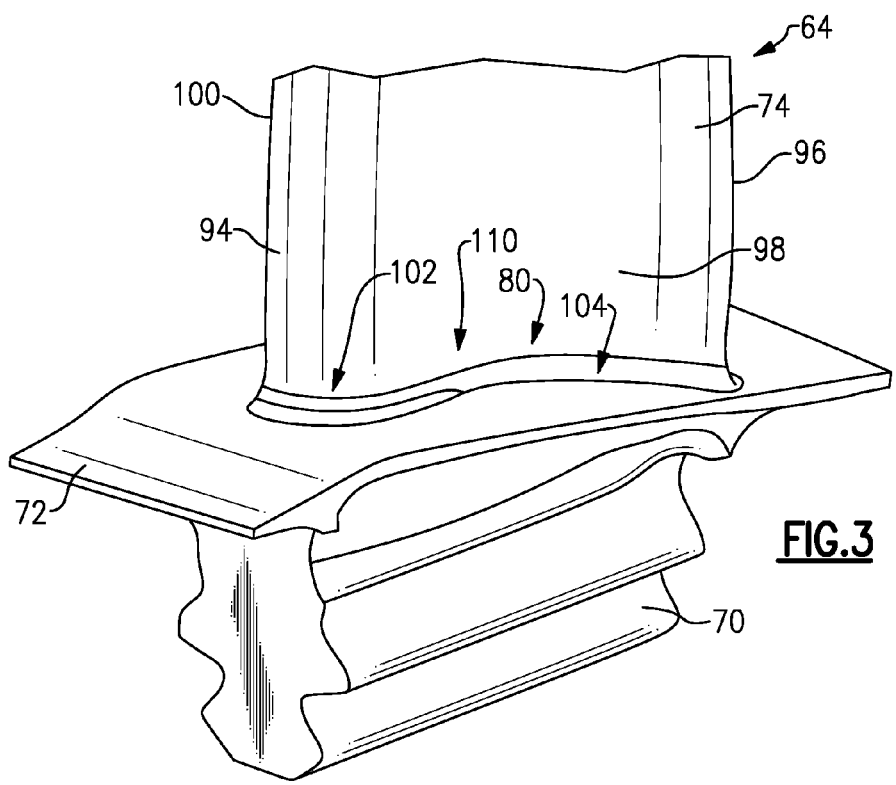
FIG. 3 is a perspective view of an example blade of the turbine section of FIG. 2.

As shown in FIG. 3, each of the array of rotor blades 64 includes a leading edge 94, a trailing edge 96, a pressure side 98, and a suction side 100. The blade fillet region 80 surrounds a perimeter of the airfoil 74 at an intersection with the platform 72. The blade fillet region 80 includes a compound fillet region 102 surrounding the leading edge 94 and extending along the pressure side 98 and the suction side 100. As the compound fillet region extends down the airfoil 74 in an axial direction, a transition fillet region 110 transitions between the compound fillet region 102 having two distinct fillet radii and a single fillet region 104 having a single fillet radius. The single fillet region 104 also surrounds the trailing edge 96 of the blade 64.

Figure 4:
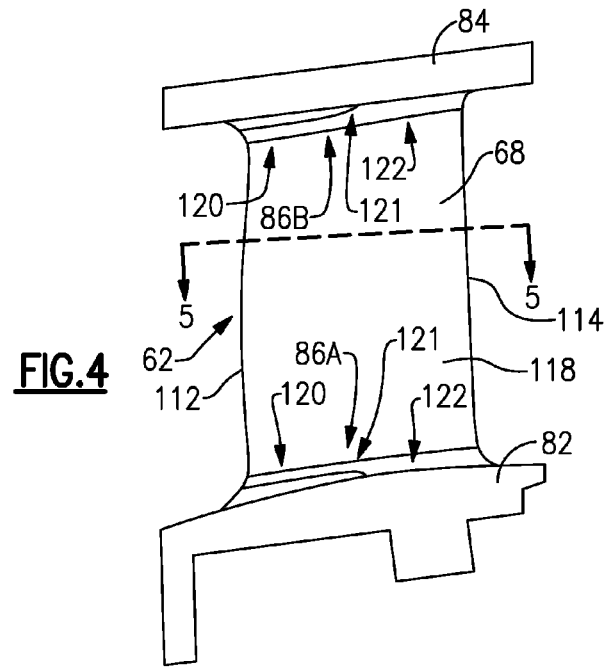
FIG. 4 is a side view of an example vane of the turbine section of FIG. 2.
Figure 5:
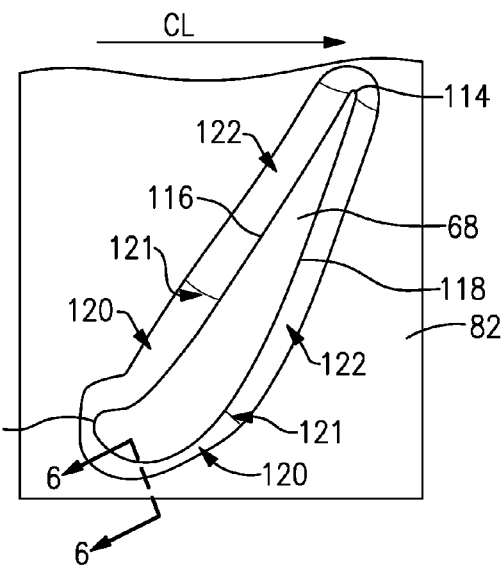
FIG. 5 is a section view taken along line 5-5 of Figure of FIG. 4.

As shown in FIGS. 4 and 5, each of the array of vanes 62 includes a leading edge 112, a trailing edge 114, a pressure side 116, and a suction side 118. The vane fillet regions 86A, 86B each surround a perimeter of the airfoil adjacent the vane inner platform 82 and the vane outer platform 84, respectively. The vane fillet regions 86A, 86B each include a compound fillet region 120 that surrounds the leading edge 112 and extends along the pressure side 116 and the suction side 118. As the compound fillet region 120 extends down the airfoil 68, a transition fillet region 121 transitions between the compound fillet region 120 defined by two distinct fillet radii and a single fillet region 122 having a single fillet radius. The single fillet region 122 also surrounds the trailing edge 114 of the vane 62.

As shown in FIG. 5, an axial chord length CL extends in an axial direction relative to the engine axis A and defines an axial length of the airfoil 68. The compound fillet region 120 extends a first distance along the axial chord length CL on the pressure side 116 and a second distance along the axial chord length CL on the suction side 118.

In the illustrated example, the first axial chord length is greater than the second axial chord length. In the illustrated example, the compound fillet region 120 extends approximately 28% of the axial chord length from the leading edge 112 on the pressure side 116 and approximately 20% of the axial chord length from the leading edge 112 on the suction side 118. In another example, the compound fillet region 120 extends approximately 23% to 32% of the axial chord length from the leading edge 112 on the pressure side 116 and approximately 15% to 25% of the axial chord length from the leading edge 112 on the suction side 118.

The single fillet region 122 extends from approximately 48% of the axial chord length on the pressure side 116 around the trailing edge 114 to approximately 50% of the axial chord length on the suction side 118 of the airfoil 68. The transition fillet region 121 separates the compound fillet region 120 from the single fillet region 122 to transition from the compound fillet region 120 to the single fillet region 122.

Although the above description is in reference to the compound fillet region 120, the transition fillet region 121, and the single fillet region 122 located on the vane 62, the examples also apply to the compound fillet region 102, the transition fillet region 110, and the single fillet region 104 located on the blade 64.

Figure 6:
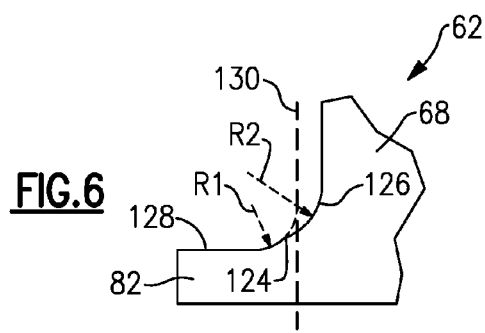
FIG. 6 is a section view taken along line 6-6 of Figure of FIG. 5.

FIG. 6 illustrates a cross section of the example compound fillet region 120. The compound fillet region 120 includes a first fillet portion 124 and a second fillet portion 126. The first fillet portion 124 includes a curvature having a radius R1 that is tangent to a radially outer surface 128 of the vane inner platform 82 and an airfoil offset 130. The airfoil offset 130 is a surface spaced outward and generally parallel to the airfoil 68 that is used to define a tangential surface for the first fillet portion 124. The airfoil offset 130 extends in a radial direction relative to the engine axis A.

The second fillet portion 126 includes a curvature having a radius R2 that is tangent to an exterior surface of the airfoil 68 and the first fillet portion 124. In the illustrated example, the first fillet portion 124 includes a radius that is smaller than a radius of the second fillet portion 126 with the airfoil offset 130 being smaller than the radius of the first fillet portion 124 and the second fillet portion. The single fillet region 122 has a radius larger than the radius of the first fillet portion 124 but smaller than the radius of the second fillet portion 126.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A component for a gas turbine engine comprising:
an airfoil having a first end;
a first platform located at the first end of the airfoil;
a compound fillet including a first fillet portion tangent to the first platform and an airfoil offset and a second fillet portion tangent to a surface of the airfoil and the first fillet portion; and
a single fillet region having a single fillet separated from the compound fillet by a transition fillet region having a transition fillet, wherein the single fillet includes a radius larger than the radius of the first fillet portion and smaller than a radius of the second fillet portion.

2. The component of claim 1, wherein the airfoil offset is a surface extending generally parallel to the airfoil.

3. The component of claim 1, wherein the first fillet portion has a first radius and the second fillet portion has a second radius that is greater than the first radius.

4. The component of claim 1, wherein the first fillet portion includes a radius of approximately 0.125 inches, the second fillet portion includes a radius of approximately 0.700 inches, and the airfoil offset is spaced from the airfoil approximately 0.022 inches.

5. The component of claim 1, wherein the single fillet is located at an intersection of the first end and the first platform and spaced from the compound fillet.

6. The component of claim 5, wherein the transition fillet is located at the intersection of the first end and the first platform axially between the compound fillet and the single fillet.

7. The component of claim 5, wherein the compound fillet extends from 23% to 32% of an axial chord length from the leading edge of the airfoil on a pressure side of the airfoil around the leading edge of the airfoil and to 15% to 25% of the axial chord length from the leading edge on a suction side of the airfoil.

8. The component of claim 7, wherein the compound fillet extends from 28% of the axial chord length from the leading edge on the pressure side around the leading edge of the airfoil and to 20% of the axial chord length from the leading edge on the suction side.

9. The component of claim 7, wherein the single fillet extends from 48% of the axial chord length from the leading edge on the pressure side around the trailing edge of the airfoil to 50% of the axial chord length from the leading edge on the suction side.

10. The component of claim 1, wherein the airfoil is a vane and includes a second platform located at a second end of the airfoil and a second compound fillet located at an intersection of the second end and the second platform.

11. The component of claim 1, wherein the first fillet portion is tangent to a radially outer surface of the first platform.

12. A gas turbine engine comprising:
an airfoil located in one of a compressor section or a turbine section;
a first platform attached to the airfoil;
a compound fillet including a first fillet portion tangent to the first platform and an airfoil offset and a second fillet portion tangent to a surface of the airfoil and the first fillet portion; and
a single fillet region having a single fillet separated from the compound fillet by a transition fillet region having a transition fillet, wherein the single fillet includes a radius larger than the radius of the first fillet portion and smaller than a radius of the second fillet portion.

13. The gas turbine engine of claim 12, wherein the airfoil offset is a surface extending generally parallel to the airfoil.

14. The gas turbine engine of claim 12, wherein the first fillet portion has a first radius and the second fillet portion has a second radius that is greater than the first radius.

15. The gas turbine engine of claim 12, wherein the single fillet region is located at an intersection of the airfoil and the first platform and spaced from the compound fillet.

16. The gas turbine engine of claim 12, wherein the airfoil is a vane and includes a second platform attached to the airfoil and a second compound fillet located at an intersection of the airfoil and the second platform.

17. A method of forming an airfoil comprising:
locating a platform relative to an airfoil;
forming a compound fillet with a first fillet portion tangent to the platform and an airfoil offset and a second fillet portion tangent to the first fillet portion and a surface of the airfoil; and
forming a single fillet region having a single fillet separated from the compound fillet by a transition fillet region having a transition fillet, wherein the single fillet includes includes a radius larger than the radius of the first fillet portion and smaller than the radius of the second fillet portion.

18. The method of claim 17, wherein the airfoil offset is a surface extending generally parallel to the airfoil.

19. The method of claim 17, wherein the first fillet portion has a first radius and the second fillet portion has a second radius that is greater than the first radius.

20. The method of claim 17, wherein the single fillet is located at an intersection of the airfoil and the first platform and spaced from the compound fillet.

\* \* \* \* \*